United States Patent
Kazusa et al.

(10) Patent No.: US 8,944,153 B2
(45) Date of Patent: Feb. 3, 2015

(54) FIN OF HEAT EXCHANGER, HEAT EXCHANGER, AND AIR CONDITIONING APPARATUS

(75) Inventors: Takuya Kazusa, Sakai (JP); Kanji Akai, Sakai (JP); Daisuke Hiratsuka, Sakai (JP); Kiyoshi Yamakawa, Sakai (JP); Yasuhiro Ohkura, Sakai (JP); Yoshiyuki Matsumoto, Kusatsu (JP); Kenji Terano, Sakai (JP); Masami Suga, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/122,558

(22) PCT Filed: Apr. 12, 2012

(86) PCT No.: PCT/JP2012/059956
§ 371 (c)(1),
(2), (4) Date: Nov. 26, 2013

(87) PCT Pub. No.: WO2012/165058
PCT Pub. Date: Dec. 6, 2012

(65) Prior Publication Data
US 2014/0083657 A1    Mar. 27, 2014

(30) Foreign Application Priority Data

May 31, 2011 (JP) .................................. 2011-122913
Oct. 5, 2011 (JP) .................................. 2011/220694

(51) Int. Cl.
*F25D 21/00* (2006.01)
*B01D 59/26* (2006.01)
(Continued)

(52) U.S. Cl.
CPC .................. *F28F 3/02* (2013.01); *F28F 13/182* (2013.01); *F28F 21/084* (2013.01); *F24F 13/30* (2013.01);
(Continued)

(58) Field of Classification Search
USPC .......................... 165/133; 62/94, 281; 96/154
See application file for complete search history.

(56) References Cited

U.S. PATENT DOCUMENTS 4,775,588 A * 10/1988 Ishii et al. ...................... 428/327
5,580,370 A * 12/1996 Kuma et al. ...................... 96/154
(Continued)

FOREIGN PATENT DOCUMENTS

JP          02101395 A   *  4/1990   ................ F28F 1/32
JP    2002-162186 A       6/2002
(Continued)

OTHER PUBLICATIONS

International Search Report of corresponding PCT Application No. PCT/JP2012/059956.
(Continued)

*Primary Examiner* — Leonard R Leo
(74) *Attorney, Agent, or Firm* — Global IP Counselors (57) ABSTRACT

A fin for a heat exchanger of an air conditioning apparatus includes a base material, a hydrophilic layer, and a corrosion-resistant layer provided between the base material and the hydrophilic layer. A contact angle of a surface of the hydrophilic layer with water is no more than 50 degrees. A water content of the hydrophilic layer per $dm^2$ of the surface of the hydrophilic layer being at least 60 $mg/dm^2$ and no more than 300 $mg/dm^2$.

12 Claims, 5 Drawing Sheets

(51) Int. Cl.
B01D 53/02 (2006.01)
F28F 13/18 (2006.01)
F28F 3/02 (2006.01)
F28F 21/08 (2006.01)
F24F 13/30 (2006.01)
F24F 1/00 (2011.01)
C09D 5/00 (2006.01)

(52) U.S. Cl.
CPC ........... *F24F 1/0059* (2013.01); *F28F 2245/02* (2013.01); *F28F 2265/20* (2013.01); *C09D 5/00* (2013.01)
USPC ................ 165/133; 62/94; 62/281; 96/154

(56) References Cited

U.S. PATENT DOCUMENTS 7,323,194 B2 * 1/2008 Jang ............................. 424/604
7,704,305 B2 * 4/2010 Nishida ........................ 96/154

FOREIGN PATENT DOCUMENTS

| JP | 2003-287394 A | 10/2003 |
| JP | 2007-225174 A | 9/2007 |
| JP | 2008-145063 A | 6/2008 |
| JP | 2008-215757 A | 9/2008 |
| JP | 2010-159379 A | 7/2010 |

OTHER PUBLICATIONS

International Preliminary Report of corresponding PCT Application No. PCT/JP2012/059956.

European Search Report of corresponding EP Application No. 12 79 3640.9 dated May 2, 2014.

* cited by examiner

FIN OF HEAT EXCHANGER, HEAT EXCHANGER, AND AIR CONDITIONING APPARATUS

CROSS-REFERENCE TO RELATED APPLICATIONS

This U.S. National stage application claims priority under 35 U.S.C. §119(a) to Japanese Patent Applications No. 2011-122913, filed in Japan on May 31, 2011, and 2011-220694, filed in Japan on Oct. 5, 2011, the entire contents of which are hereby incorporated herein by reference.

TECHNICAL FIELD

The present invention relates to a fin of a heat exchanger, a heat exchanger, and an air conditioning apparatus.

BACKGROUND ART

In the past, air conditioning apparatuses have been proposed such as the one disclosed in Japanese Laid-open Patent Application No. 2008-215757, for example, wherein the configuration of the fins of the heat exchanger is connived so that when an air-cooling operation and/or a dehumidifying operation is performed, condensed water adhering to the fin surfaces of the heat exchanger flows down efficiently.

In the air conditioning apparatus disclosed in Japanese Laid-open Patent Application No. 2008-215757, when the condensed water adhering to the fin surfaces of the heat exchanger remains for a long time on the fin surfaces even when operation has stopped, problems have been observed in that airborne substances adhere and/or bacteria proliferates, and an odor arises. To resolve such problems, not only are hydrophilic layers formed on the fin surfaces, but the shape employed for the fins is one that inhibits condensed water retention, for the purpose of shortening the time during which condensed water remains on the fin surfaces of the heat exchanger.

SUMMARY

Technical Problem

With the shape of the fins of the heat exchanger disclosed in the aforementioned Japanese Laid-open Patent Application No. 2008-215757, because condensed water is inhibited from being retained in the fin surfaces, the adhesion of environmental suspended substances and/or the proliferation of bacteria can be suppressed in the fin surfaces and the odor arising is reduced.

The inventors of the present application have discovered that during the air-cooling operation and/or the dehumidifying operation, odor is often perceived after a switch is made from a thermo-on state in which both the compressor and the indoor fan of the air conditioning apparatus are driven, to a thermo-off state in which the compressor stops and the indoor fan continues to be driven (before a transition is made back to the thermo-on state).

Based on the above knowledge, it is believed that the odor arising from the air conditioning apparatus could be reduced more than in conventional practice, and the existence of new causes for odor have been examined, which are different from causes relating to condensed water on the fin surfaces of the heat exchanger, such as the adhesion of environmental suspended substances and/or the breeding of bacteria while operation has stopped, as have been examined in the aforementioned Patent Literature 1.

As a result of examining these points, the inventors believe that because odor is often perceived when condensed water has evaporated from the fin surfaces of the heat exchanger after a switch has been made to the thermo-off state, among the various odoriferous component, a specific odoriferous component having a lower vapor pressure than the condensed water (i.e. an odoriferous component that tends to gasify after the condensed water) is particularly the cause of odor.

Furthermore, as a result of thoroughgoing examinations, the inventors have found that with the specific odoriferous component that causes such an odor, the odoriferous component present with the water component retained in the hydrophilic layers of the fins of the heat exchanger is more problematic as an odor perceived after the switch to the thermo-off state, than the odoriferous component present with the condensed water on the surfaces of the fins of the heat exchanger. In view of this, upon examining the configuration and/or characteristics of fins which influence the amount of the specific odoriferous component retained in the heat exchanger, the inventors have discovered that the amount of water component (the water content) retained in the hydrophilic layers of the fins of the heat exchanger is the cause of variation in the amount of the specific odoriferous component retained in the fins.

The inventors thereby believe that the odor perceived after the switch to the thermo-off state could possibly be minimized by minimizing the water content of the hydrophilic layers of the fins.

However, when merely a low water content is the only quality of the hydrophilic layers of the fins of the heat exchanger, the hydrophilicity of the fin surfaces is reduced at the same time; therefore, the condensed water is repelled by the surfaces of the fins of the heat exchanger before scattering into the room, and performance decreases due to an increase in draft resistance between fins.

The present invention was perfected upon additional examination in view of the foregoing, it being an object thereof to provide a fin of a heat exchanger, a heat exchanger, and an air conditioning apparatus whereby increases in draft resistance in the heat exchanger and scattering of condensed water are suppressed, and odor can be suppressed as well.

Solution to Problem

A fin of a heat exchanger according to a first aspect of the present invention is a fin of a heat exchanger of an air conditioning apparatus, and includes a base material, a hydrophilic layer, and a corrosion-resistant layer. The corrosion-resistant layer is provided between the base material and the hydrophilic layer. A contact angle of a surface of the hydrophilic layer with water is 50 degrees or less. A water content of the hydrophilic layer per square decimeter of the surface of the hydrophilic layer is 400 mg/dm$^2$ or less. The term "water content" herein is a value obtained by immersing the bottom end of a fin into 1 mm or more of water, recording the mass as the initial mass, submerging the fin in a predetermined depth of water and leaving it submerged for fourteen hours, finding the difference between the initial mass and the mass measured thirty seconds after returning the fin to the position where the initial mass was measured, and dividing this difference by the surface area. The "water content" is measured in an environment having an atmospheric temperature of 28° C., and the sample used in the measurement is dried for at least sixteen hours in a drier at 80° C. The surface area is the total surface area of the front and rear surfaces.

With this fin of a heat exchanger, based on the fact that a correlation was discovered between the water content of the hydrophilic layer and the amount of odoriferous component retained, the water content of the hydrophilic layer was adjusted to 400 mg/dm² or less, and the amount of odoriferous component retained was successfully reduced. Furthermore, with this fin of a heat exchanger, an increase in draft resistance and scattering of condensed water in the heat exchanger were successfully suppressed by maintaining the contact angle of the surface of the hydrophilic layer with the water at 50 degrees or less, even when the water content of the hydrophilic layer was minimized.

As described above, with this fin of a heat exchanger, it is possible to suppress increases in draft resistance and scattering of condensed water in the heat exchanger, and to suppress odor as well.

A fin of a heat exchanger according to a second aspect of the present invention is the fin of a heat exchanger according to the first aspect, wherein the contact angle of the surface of the hydrophilic layer with water is 30 degrees or less.

With this fin of a heat exchanger, decreases in draft resistance between the fins of the heat exchanger and scattering of condensed water can be more reliably suppressed.

A fin of a heat exchanger according to a third aspect of the present invention is the fin of a heat exchanger according to the first or second aspect, wherein a film thickness of the hydrophilic layer is 0.1 μm or greater. The film thickness of the hydrophilic layer herein is preferably the film thickness after coating and drying.

With this fin of a heat exchanger, the hydrophilicity in the surface of the hydrophilic layer can be more reliably ensured.

A fin of a heat exchanger according to a fourth aspect of the present invention is the fin of a heat exchanger according to any of the first through third aspects, wherein the hydrophilic layer includes, as a coating film forming component, either: a polymer configured from a monomer having one or at least two hydrophilic functional groups selected from a group consisting of a carboxylic acid group, a sulfonic acid group, a hydroxy group, an amide group, and an ether bond; a copolymer configured including the aforementioned monomer; or a mixture of the aforementioned polymer and the aforementioned copolymer.

A heat exchanger according to a fifth aspect of the present invention includes the fin of a heat exchanger according to any of the first through fourth aspects.

An air conditioning apparatus according to a sixth aspect of the present invention includes the heat exchanger according to the fifth aspect, a fan for blowing air at the heat exchanger, a compressor, and a control unit. The control unit performs thermo-off operation control for driving the fan while the driving of the compressor has been stopped.

This air conditioning apparatus is capable of minimizing the amount of the odoriferous component arising, even when thermo-off operation control is performed while condensed water remains on the surfaces of the fins of the heat exchanger.

Advantageous Effects of Invention

With the fin of a heat exchanger according to the first, fourth, and fifth aspects of the present invention, it is possible to suppress increases in draft resistance in the heat exchanger and scattering of condensed water, and to suppress odor as well.

With the fin of a heat exchanger according to the second aspect of the present invention, it is possible to more reliably suppress decreases in draft resistance between the fins of the heat exchanger and scattering of condensed water.

With the fin of a heat exchanger according to the third aspect of the present invention, it is possible to more reliably ensure hydrophilicity in the surface of the hydrophilic layer.

With the air conditioning apparatus according to the sixth aspect of the present invention, it is possible to minimize the amount of the odoriferous component arising, even when thermo-off operation control is performed while condensed water remains on the surfaces of the fins of the heat exchanger.

DESCRIPTION OF EMBODIMENTS

An air conditioning apparatus 1 as an embodiment of the present invention is described below with reference to the drawings.

Figure 1:
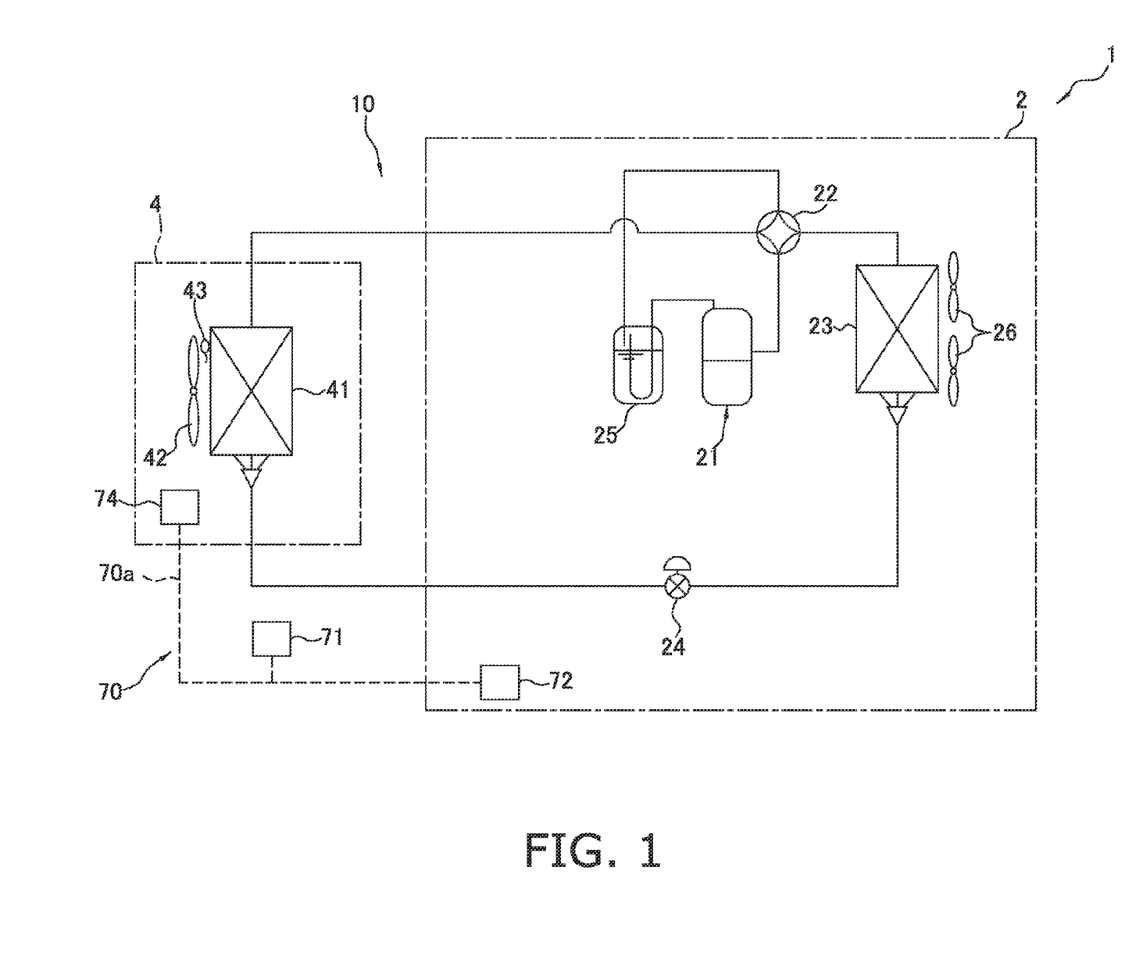
FIG. 1 is a schematic configuration diagram of an air conditioning apparatus according to an embodiment of the present invention.

FIG. 1 is a refrigerant circuit diagram showing the refrigerant circuit 10 of the air conditioning apparatus 1.

(1) Schematic Configuration of Air Conditioning Apparatus 1

In the air conditioning apparatus 1, an outdoor unit 2 used as a heat-source-side device and an indoor unit 4 used as a usage-side device are connected by refrigerant tubes, and air conditioning is performed in the space where the usage-side device is disposed. The air conditioning apparatus 1 has a refrigerant circuit 10, various sensors, and a control unit 70.

The refrigerant circuit 10 includes a compressor 21, a four-way switching valve 22, an outdoor heat exchanger 23, an outdoor electromagnetic expansion valve 24, an accumulator 25, outdoor fans 26, an indoor heat exchanger 41, an indoor fan 42, and other components, which are all connected. The compressor 21, the four-way switching valve 22, the outdoor heat exchanger 23, the outdoor electromagnetic expansion valve 24, the accumulator 25, and the outdoor fans 26 are accommodated in the outdoor unit 2, and the indoor heat exchanger 41 and the indoor fan 42 are accommodated in the indoor unit 4. The air quantity of the indoor fan 42 is adjusted among a plurality of levels by a control unit 70 described hereinafter, but in this case the maximum air quantity is 40 to 45 m³/s and the minimum air quantity is 15 to 20 m³/s. The detailed configuration of the indoor heat exchanger 41 is described hereinafter.

The four-way switching valve 22 is capable of switching between an air-cooling operation cycle and an air-warming operation cycle. In FIG. 1, the connection state when the air-cooling operation is performed is shown in solid lines, and the connection state when the air-warming operation is performed is shown in dashed lines. During the air-warming operation, the indoor heat exchanger 41 functions as a cooler of refrigerant, and the outdoor heat exchanger 23 functions as a heater of refrigerant. During the air-cooling operation, the outdoor heat exchanger 23 functions as a cooler of refrigerant, and the indoor heat exchanger 41 functions as a heater of refrigerant.

An indoor temperature sensor 43 is provided inside the indoor unit 4. This indoor temperature sensor 43, which is disposed on a side having an intake port for indoor air, detects the temperature of air taken into the indoor unit 4 from the room, before the air passes through the indoor heat exchanger 41 (i.e., the indoor temperature).

The control unit 70 is configured from an outdoor control unit 72 for controlling the instruments disposed inside the outdoor unit 2, an indoor control unit 74 for controlling the instruments disposed inside the indoor unit 4, a controller 71 for receiving various setting inputs from the user and performing various display outputs, and various sensors, which are all connected by a communication line 70a. The control unit 70 performs controls on the air conditioning apparatus 1.

The control unit 70 receives the selection of the air-cooling operation, the air-warming operation, and a dehumidifying operation from the user via the controller 71. In the dehumidifying operation, the control unit 70 puts the four-way switching valve 22 into the same connection state as in the air-cooling operation cycle, and intermittently drives the indoor fan 42. In the air-cooling operation, the control unit 70 performs control so that until the fulfilling of predetermined conditions based on the set temperature inputted to the controller 71, a thermo-on state is implemented in which both the compressor 21 and the indoor fan 42 continue to be driven, and after the predetermined conditions are fulfilled until the predetermined conditions again cease to be fulfilled, a thermo-off state is implemented in which the compressor 21 is stopped and the indoor fan 42 continues to be driven.

(2) Configuration of Indoor Heat Exchanger 41

The indoor heat exchanger 41 is a "fin-tube" heat exchanger in which a group of fins 5 are arranged in a plurality in a predetermined pitch in the direction of plate thickness, and passing through the fins is a heat transfer tube in which refrigerant flows through the interior. The plate thickness of a single fin 5 is preferably 80 to 120 µm, for example. The fin pitch is preferably 1.0 to 2.5 mm, for example.

(3) Configuration of Fins 5

Figure 2:
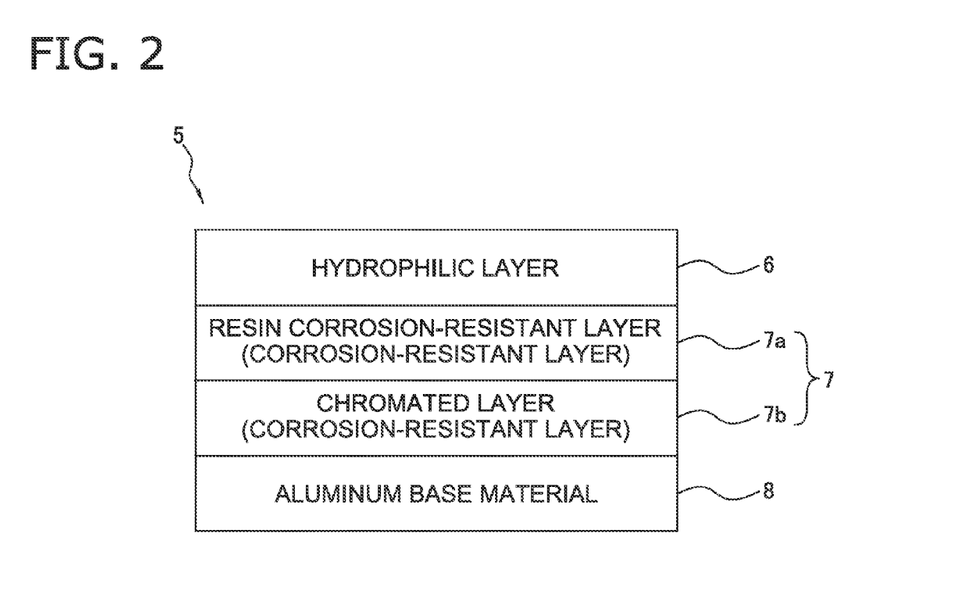
FIG. 2 is a schematic cross-sectional view showing an example of a configuration of the fin of the present invention.

Each of the fins 5 of the indoor heat exchanger 41 has an aluminum base material 8, a corrosion-resistant layer 7, and a hydrophilic layer 6, as shown in FIG. 2.

The aluminum base material 8 is configured from aluminum, which is a metal having good heat conduction in order to improve heat exchange efficiency. The aluminum base material 8 may be configured from pure aluminum or an aluminum alloy.

The corrosion-resistant layer 7, which is provided between the aluminum base material 8 and the hydrophilic layer 6, has a resin corrosion-resistant layer 7a and chromated layer 7b. Of these layers, the chromated layer 7b is a corrosion-resistant layer formed by performing a chromate treatment on the surface of the aluminum base material 8. The resin corrosion-resistant layer 7a is a corrosion-resistant layer configured from one or at least two resins selected from the group consisting of an epoxy resin, an acrylic resin, a urethane resin, and a phenol resin. From the standpoint that good adhesion between the aluminum base material 8 and the hydrophilic layer 6 is easily achieved, an epoxy resin, which is heat-curable, is preferred.

Figure 3:
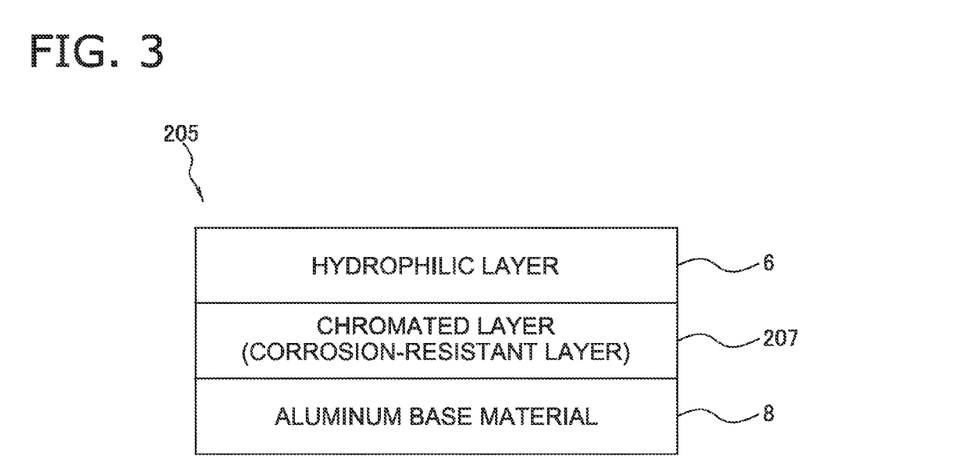
FIG. 3 is a schematic cross-sectional view showing another example of a configuration of the fin of the present invention.

The resin corrosion-resistant layer 7a may be omitted as appropriate according to the environment of use and/or the application, and a hydrophilic layer 206 may be provided on the surface of a chromated layer (a corrosion-resistant layer) 207 for protecting an aluminum base material 208, as in the fin 205 shown in FIG. 3, for example.

The hydrophilic layer 6 constitutes the surface layer of the fin 5 of the indoor heat exchanger 41. The details of the hydrophilic layer of the present invention are given below.

(4) Configuration of Hydrophilic Layer

In the hydrophilic layer, the angle of contact with water in the surface is 50 degrees or less, and the water content of the hydrophilic layer per square decimeter of the surface of the hydrophilic layer is 400 mg/dm$^2$ or less.

The angle of contact with water in the surface of the hydrophilic layer is not particularly limited as long as it is 50 degrees or less, but from the standpoint of further minimizing draft resistance against air passing through the heat exchanger and preventing condensed water from scattering into the room, the angle is preferably 40 degrees or less, and more preferably 30 degrees or less. The angle of contact herein is a value measured according to the method presented in "JIS R 3257: Wettability test method of substrate glass surfaces."

The water content of the hydrophilic layer is the mass of the water component that can be retained in a thickness portion (the portion between the surface and the corrosion-resistant layer) corresponding to 1 dm$^2$ of the surface of the hydrophilic layer. For a sufficiently dried fin, the mass when the bottom end of the fin is immersed in 1 mm or more of water at room temperature is the initial mass, the fin is left submerged for fourteen hours in a predetermined depth of water, the mass is measured thirty seconds after returning to the position where the initial mass was measured, and the difference between this mass and the initial mass is divided by the surface area to find the value of the water content of the hydrophilic layer (referred to below simply as "water content"). The "water content" was measured in a room temperature environment at an atmospheric temperature of 28° C., and the sample used in the measurement was dried for sixteen hours or more in a drier at 80° C. The surface area is the sum total of the surface areas of both the front and back surfaces. The upper limit of the water content of the hydrophilic layer is not particularly limited as long as it is 400 mg/dm$^2$ or less, but from the standpoint of reducing the odoriferous component retained, the upper limit is preferably 300 mg/dm$^2$ or less, more preferably 240 mg/dm$^2$ or less, and most preferably 180 mg/dm$^2$ or less. The tower limit of the water content of the hydrophilic layer is not particularly limited, but because the hydrophilicity of the surface of the hydrophilic layer tends to decrease when the water content of the hydrophilic layer is too low, the lower limit is preferably 60 mg/dm$^2$ or greater.

The combination of the contact angle and the water content of the hydrophilic layer is not particularly limited as long as it fulfills the conditions stated above, but it is preferable that the contact angle be 5 to 40 degrees and the water content be 60 to 240 mg/dm$^2$, and it is more preferable that the contact angle be 5 to 30 degrees and the water content be 90 to 210 mg/dm$^2$.

The film thickness of the hydrophilic layer is not particularly limited, but is preferably 0.1 µm or greater in order to ensure sufficient hydrophilicity. The upper limit of the film thickness of the hydrophilic layer is not particularly limited, but is preferably 10 µm or less from the standpoint of exhibiting sufficient heat exchange performance by ensuring space between fins and minimizing draft resistance.

The material of the hydrophilic layer is not particularly limited as long as it fulfills the conditions of the water content and the contact angle, but the material can include, as a film coating forming component, either: (i) a polymer configured from a monomer having one or at least two hydrophilic functional groups selected from the group consisting of a carboxylic acid group, a sulfonic acid group, a hydroxy group, an amide group, and an ether bond; (ii) copolymer configured including the aforementioned monomer; or (iii) a mixture of the aforementioned polymer and the aforementioned copolymer. These functional groups can be selected as appropriate in order to adjust the extent of hydrophilicity imparted to the hydrophilic layer. Of these groups, some or all of the carboxylic acid group and/or the sulfonic acid group may be an alkali metal salt. Examples of the alkali metal salt include lithium salt, sodium salt, potassium salt, and the like, of which sodium salt is preferred. Possible examples of the resin containing the polymer or copolymer in (i) to (iii) above include, specifically, a polyvinyl alcohol resin(polyvinyl alcohol and a derivative thereof), a polyacryl amide resin (polyacryl amide and a derivative thereof), a polyacrylic acid resin (polyacrylic acid and a derivative thereof), a cellulose resin (e.g., carboxymethyl cellulose sodium, carboxymethyl cellulose ammonium), a polyethylene glycol resin (e.g., polyethylene glycol, polyethylene oxide), and the like. The resins in (i) to (iii) may include water dispersible silica (colloidal silica), alkali silicate (water glass), or the like, for example.

(5) Manufacture of Fin 5 of Indoor Heat Exchanger 41

The method for manufacturing the indoor heat exchanger 41 described above is not particularly limited.

For example, a fin can be obtained by chromate-treating and drying the prepared aluminum base material, coating the chromated surface with the resin constituting the resin corrosion-resistant layer, drying the coating, then applying a coating of the resin constituting the hydrophilic layer, and drying the coating. These drying steps may be performed by heating.

The aluminum base material described above may have a plurality of openings formed in advance in which heat transfer tubes are to be passed through. The plurality of openings may be provided after the hydrophilic layer is formed.

A plurality of fins obtained in this manner are aligned in the direction of plate thickness, heat transfer tubes are inserted through the openings, in which state the heat transfer tubes are treated to expand, whereby the plurality of fins and heat transfer tubes are integrated and a heat exchanger is obtained.

The heat exchanger obtained in this manner is incorporated as a usage-side heat exchanger of the refrigeration cycle, whereby the indoor heat exchanger 41 described above can be obtained.

(6) Action

As described above, when the air-cooling operation and/or the dehumidifying operation is being performed and the control unit 70 implements the thermo-on state of continually driving both the compressor 21 and the indoor fan 42, cooled refrigerant flows into the heat transfer tubes of the indoor heat exchanger 41. The fins 5 are thereby also cooled, the water component in the air flowing over the surfaces of the fins 5 condenses, and condensed water adheres to the surfaces of the fins 5. Because the surfaces of the fins 5 have the hydrophilicity of the hydrophilic layers 6, the condensed water settles over the surfaces rather than forming droplets and does not scatter into the room along with the conditioned air flow. Furthermore, because the condensed water comes to be spread out over the surfaces due to the hydrophilicity of the hydrophilic layers 6, increases in draft resistance can be suppressed without narrowing the spaces between the fins 5, and sufficient heat exchange capability can be ensured. The amount of condensed water retained within the hydrophilic layers 6 is also kept to a minimum because the water content is adjusted to be low. In the thermo-on state, condensed water that could not be retained in the surfaces of the fins 5 flows down the surfaces of the fins 5, falls into a drain pan (not shown), and reaches a drainage channel where it undergoes a drainage treatment. Much of the condensed water in which the odoriferous component has dissolved undergoes a wastewater treatment.

After the thermo-on state has continued for some time, when a predetermined condition is fulfilled in the indoor environment, the control unit 70 stops the operation of the compressor 21 and implements the thermo-off state of continually driving the indoor fan 42 until predetermined condition is once again no longer fulfilled. Some of the condensed water on the surfaces of the fins 5 of the indoor heat exchanger 41 reaches the drainage channel from the drain pan to undergo the drainage treatment, while the rest is gasified. Afterward, when the surfaces of the hydrophilic layers 6 of the fins 5 dry, the interiors of the hydrophilic layers 6 of the fins 5 begin to dry, and the water component retained in the interiors of the hydrophilic layers 6 is kept to a minimum. Therefore, because the amount of the odoriferous component dissolved in the water component retained in the interiors of the hydrophilic layers 6 is also kept to a minimum, the amount of the odoriferous component blown out from the indoor heat exchanger 41 into the room in the thermo-off state can also be sufficiently reduced.

(7) Example of Fin

Below is a detailed description of the results of examining an example of a fin of the heat exchanger that can be employed in the above embodiment.

(7-1) Samples

As is described hereinafter, fins were prepared for samples corresponding to Working Examples 1 to 3 and Comparative Examples 1 to 4, and the extent of the odor arising from each sample was compared. Samples of different quality were prepared by adjusting the extent of plasma treatment and/or oxidant treatment for hydrophilizing the surfaces of the hydrophilic layers in the prepared samples, and adjusting the extent of heating, the amount of cross-linking agent blended in, and/or the type of cross-linking agent for hydrophobizing the interiors of the hydrophilic layers.

(7-2) Odoriferous Component to be Evaluated

It was a condition that the odoriferous component in question be water soluble because the odoriferous component could be retained together with condensed water in the interiors of the hydrophilic layers. Because the odoriferous component in question occurs after condensed water volatizes on the surfaces of the hydrophilic layers of the fins, it was a condition that the odoriferous component have the property of being less volatile than water at the temperature at which the heat exchanger of the air conditioning apparatus is used. In conventional practice the objects have been fatty acids reported as objects included in air quality, the fatty acids being typical examples of odoriferous components in the relevant technical field. Because the experiment involves a sensory evaluation, another condition was that the object have a comparatively small effect on a person. Furthermore, concerning the detection limit of the odor sensor being used, it was a condition that the odor sensor be capable of sensing the component even at low concentrations of a recognizable threshold that most people would be concerned with (the minimum recognizable quantity of stimulus for any type of odor).

Acetic acid was employed herein as an odoriferous component that fulfilled the conditions described above.

The vapor pressure of acetic acid at 20° C., at 1.5 kPa, is less than the vapor pressure of water under the same conditions, which is 2.3 kPa. The odor sensor used at this time was capable of sufficiently sensing the acetic acid at the recognizable threshold (0.006 ppm).

(7-3) Experiment Method

The heat exchangers of the working examples and the comparative examples were configured using model fins, the heat exchangers were set up in a temperature of 25±0.5° C. and a relative humidity of 70±5%, and the experiment was performed by channeling cooling water in place of the refrigerant to the portions equivalent to the heat transfer tubes. 8° C. cold water was used as the cooling water. The heat exchanger models configured herein had fin groups aligned with a fin pitch of 1.2 mm intervals and a total of 250 to 270 mm in the direction of plate thickness, and the heat transfer tubes passed through the fin groups had a diameter of 6 to 8 mm and a total effective length of 400 mm in two rows.

A ventilator was disposed upstream of each heat exchanger, and each ventilator had a disposed relationship such that the air flow passed between the fins. The rate of air supply to the heat exchangers was 1.5 m/s.

The odor sensor took measurements of the air flowing through the heat exchanger to a position 0.1 m downstream of the heat exchanger. The odor sensor used herein was the product: Portable Odor level Indicator XP-329 III R, made by New Cosmos Electric Co., Ltd.

In the sensory test, a person's perception by smell was used in the same position as the odor sensor.

Before being used in the tests, the heat exchangers were submerged for two hours in a pool filled with an aqueous solution having an acetic acid concentration of 5 wt %, after which the heat exchangers were submerged twice in a pool filled with pure water in order to remove the acetic acid aqueous solution remaining on the fin surfaces of the heat exchangers. The acetic acid aqueous solution remaining on the fin surfaces of the heat exchangers was thereby substantially removed, making it possible to evaluate the acetic acid alone retained in the hydrophilic layer interiors of the fins.

After having been subjected to acetic acid adhesion, the heat exchangers were supplied with an air flow from the ventilators and cold water (8° C.) was channeled to the heat transfer tubes in order to recreate the conditions of the thermo-on operation in the case of an actual refrigeration cycle, and this process was continued until condensed water forming on the fin surfaces began to drip off.

When the condensed water dripped down from the fins, the flow of cooling water to the heat transfer tubes was stopped while the air flow continued to be supplied by the ventilators in order to recreate the conditions of the thermo-off operation in the case of an actual refrigeration cycle. The odor sensor and the sensory test were performed starting at the time the flow of cooling water to the heat transfer tubes was stopped. The measurements of the odor sensor was complete at the time the value sensed by the odor sensor reached 0. The sensory test similarly continued until the person no longer experienced the odor.

(7-4) Confirming Correlation of the Values

Figure 4:
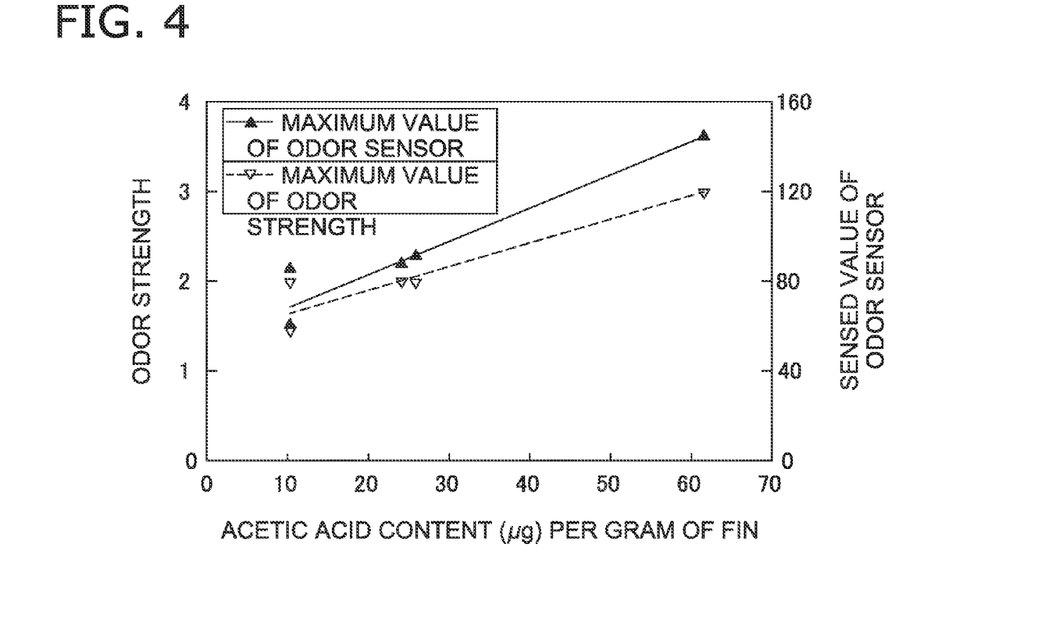
FIG. 4 is a graph showing the relationships of odor strength and integral value of odor sensor to the acetic acid content of a fin.

Before the tests of the working examples and the comparative examples were conducted, a plurality of samples having different acetic acid contents were prepared in order to confirm that there was a correlation between the amount of acetic acid retained in the hydrophilic layers and the odor actually measured. Specifically, samples having different amounts of odoriferous component (amounts of remaining acetic acid) retained in the hydrophilic layers were prepared by varying the concentration of acetic acid in the pool for submerging the heat exchangers for each sample. These samples were then used to conduct the experiment described above, and the integral values of the odor component sensed by the odor sensor (the total amount from the initial sensing of odor until odor was no longer sensed) were evaluated as was odor strength. The odor strength is a numerical quantification according to the six-stage odor strength display method (0: no scent, 1: a scent is perceived, 2: the scent that is weak but the type is discernible, 3: the scent can be easily experienced, 4: the scent is strong, 5: the scent is intense), which is a method for evaluating common scents. The mass of acetic acid contained in 1 g of a sample of the fin of the heat exchanger was measured using a GC-MS. FIG. 4 shows the relationship of odor strength to the acetic acid content per gram of fin of the samples understood as described above, and the relationship of the sensed value of the odor sensor an odor index displayed on a screen as the measured value of the odor sensor) to the same acetic acid content. According to the graph of FIG. 4, the relationship of odor strength relative to the acetic acid content per gram of fin and the relationship of the sensed value of the odor sensor relative to the acetic acid content per gram of fin were both confirmed to be proportional relationships. As described above, there is a correlation between the acetic acid retained by the hydrophilic layers of the fins and the odor strength experienced by a person.

Figure 5:
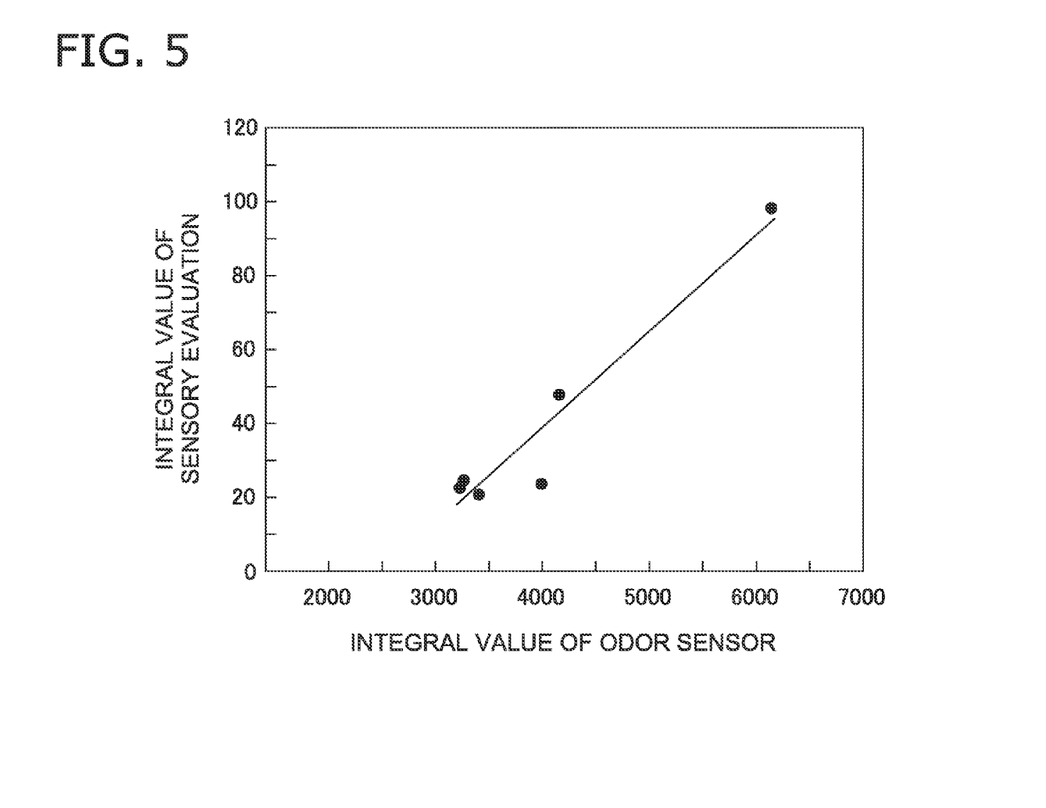
FIG. 5 is a graph showing the correlation between the integral value of the odor sensor and a sensory evaluation.

In this case, because the purpose is ultimately to reduce the odoriferous component that a person experiences, it is preferable to measure the extent of the odor actually experienced by a person, but the odor sensor described above was used in order to preserve objectivity of the evaluation. The graph of FIG. 5 shows results obtained by simultaneously conducting a sensory evaluation and taking measurements with the odor sensor on the different types of samples. As shown in the graph in FIG. 5, a proportional relationship is established between the integral value of the sensory evaluation and the integral value of odoriferous component measured using the odor sensor, and it was confirmed from the sensed value of the odor sensor used in this case that there was an objective presence of odor experienced by a person.

Figure 6:
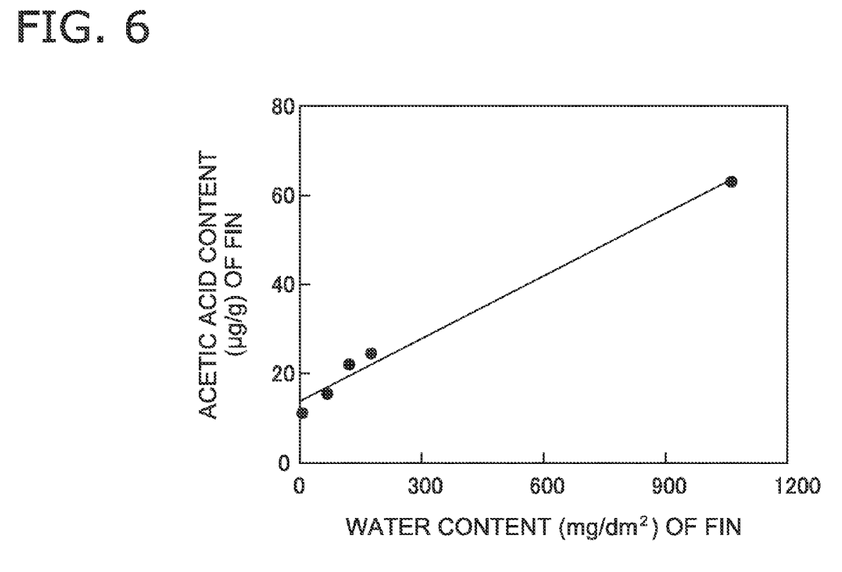
FIG. 6 is a graph showing the relationship of the odoriferous component content of a fin to the water content of the fin.

Furthermore, the graph of FIG. 6 shows the result of finding the correlation between the water component mass that can be retained in the thickness portion (the portion between the surface and the corrosion-resistant layer) corresponding to 1 $dm^2$ of the surface of a hydrophilic layer of a fin of the heat exchanger, and the content of acetic acid per gram of fin of the heat exchanger. The water content of the fin was a value obtained by immersing the bottom end of a sufficiently dried fin at room temperature into 1 mm or more of water, recording the mass as the initial mass, submerging the fin in a predetermined depth of water and leaving it submerged for fourteen hours, finding the difference between the initial mass and the mass measured thirty seconds after returning the fin to the position where the initial mass was measured, and dividing this difference by the surface area. The "water content" was measured at a room temperature environment in an atmospheric temperature of 28° C., and the sample used in the measurement was dried for at least sixteen hours in a drier at 80° C. The surface area was the total surface area of the front and rear surfaces. The acetic acid mass contained in a one gram sample of the fin of the heat exchanger was measured using a GC-MS. As shown in the graph of FIG. 6 described above, there was confirmed to be a proportional relationship between the fin water content and the fin acetic acid content.

It can thereby be concluded that when the fin has a high water content, the mass of acetic acid contained in the fin also increases.

As described above, it can be concluded from the relationships confirmed in FIGS. 4, 5, and 6 that when the water content of the fin of the heat exchanger is high, the acetic acid content as an odoriferous component increases, the value sensed by the odor sensor increases, and the odor strength experienced by a person increases.

Figure 7:
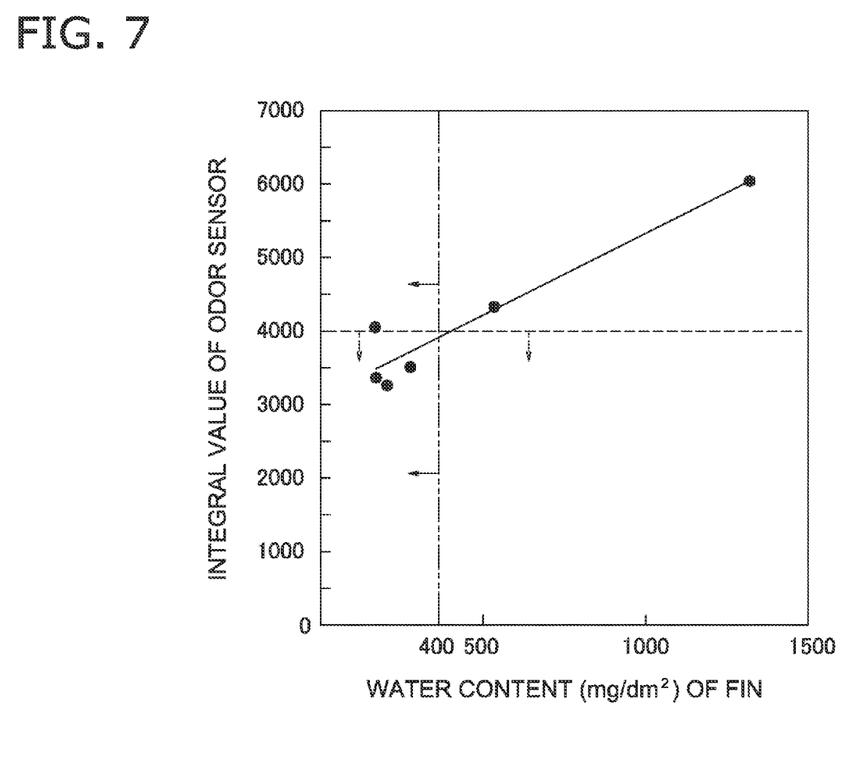
FIG. 7 is a graph showing the relationship of the integral value of the odor sensor to the water content of the fin.

Based on the relationships described above, upon specifying the integral value of the odor sensor corresponding to the concentration condition of the odoriferous component when it was possible to effectively reduce the odor experienced by a person, it was clear that the integral value of the odor sensor must be 4000 or less. According to the graph showing the relationship between the water content of the fin and the integral value of the odor sensor in FIG. 7, it was clear that in the hydrophilic layer of the fin of the heat exchanger that fulfilled the odoriferous component condition, the water content condition was 400 $mg/dm^2$ or less.

WORKING EXAMPLES

Samples having the following conditions were prepared as the samples of the working examples and the comparative examples.

Working Example 1

For Working Example 1, a sample having a water content of 5 $mg/dm^2$ in the hydrophilic layer was prepared.

Working Example 2

For Working Example 2, a sample having a water content of 190 $mg/dm^2$ in the hydrophilic layer was prepared.

Working Example 3

For Working Example 3, a sample having a water content of 120 $mg/dm^2$ in the hydrophilic layer was prepared.

Comparative Example 1

For Comparative Example 1, a sample (product name: CC430, made by Sumitomo Light Metal Industries, Ltd.) having a water content of 1300 $mg/dm^2$ in the hydrophilic layer was prepared.

Comparative Example 2

For Comparative Example 2, a sample (product name: CC431, made by Sumitomo Light Metal Industries, Ltd.) having a water content of 850 $mg/dm^2$ in the hydrophilic layer was prepared, Comparative Example 3

For Comparative Example 3, a sample (product name: KS130B, made by Kobe Steel, Ltd.) having a water content of 480 $mg/dm^2$ in the hydrophilic layer was prepared.

Comparative Example 4

For Comparative Example 4, a sample having a water content of 120 $mg/dm^2$ in the hydrophilic layer was prepared.

Figure 8:
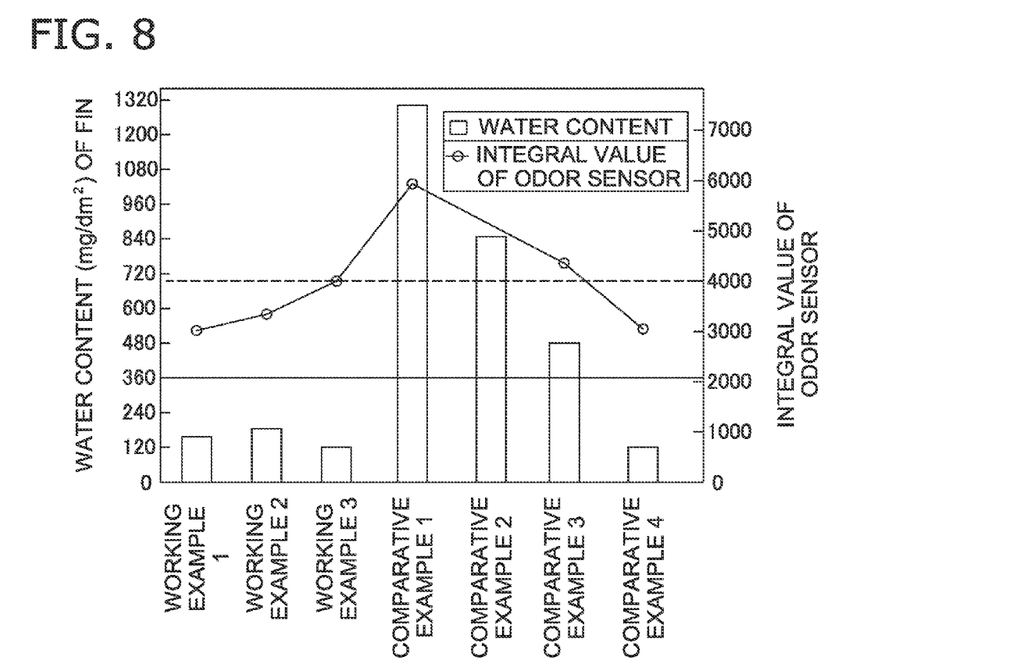
FIG. 8 is a table showing the water contents and odor sensor integral values in each of the working examples and comparative examples.

FIG. 8 shows the water content and the integral value of the odor sensors in Working Examples 1 to 3 and Comparative Examples 1 to 4. According to the results shown in FIG. 8, the odoriferous component was a problem due to high water content in Comparative Examples 1 to 3, and in Working Examples 1 to 3 and Comparative Example 4, the problem of the odoriferous component was successfully resolved because the water content could be kept to a minimum.

Furthermore, as for the quality of the hydrophilic layers, the draft resistance was successfully kept to a minimum when the fins were used in heat exchangers, and the contact angles were measured in Working Examples 1 to 3 and Comparative Examples 1 to 4 in order to examine the contact angles at which the condensed water could be kept from scattering.

The contact angle in the surface of the hydrophilic layer of the sample in Working Example 1 was 15 degrees.

The contact angle in the surface of the hydrophilic layer of the sample in Working Example 2 was 27 degrees.

The contact angle in the surface of the hydrophilic layer of the sample in Working Example 3 was 13 degrees.

The contact angle in the surface of the hydrophilic layer of the sample of Comparative Example 1 was 20 degrees.

The contact angle in the surface of the hydrophilic layer of the sample of Comparative Example 2 was 11.4 degrees.

The contact angle in the surface of the hydrophilic layer of the sample of Comparative Example 3 was 40 degrees.

The contact angle in the surface of the hydrophilic layer of the sample of Comparative Example 4 was 77 degrees.

The draft resistance of the heat exchangers herein was kept to a minimum, and the contact angle of the surfaces of the hydrophilic layers to water, at which scattering of the condensed water could be suppressed, was 50 degrees or less. This contact angle value was established as the contact angle that fulfilled the condition that the draft resistance ratio between a draft resistance A and a draft resistance B below (draft resistance B/draft resistance A) be 1.54 or less. The draft resistance A is the draft resistance when a heat exchanger model having a fin pitch of 1.2 mm intervals was set up in an environment in which the air speed in the front surface of the heat exchanger was 1.5 m/s, the dry-bulb temperature when the surfaces of the hydrophilic layers of the fins were dry was 21° C., and the wet-bulb temperature was 15° C.; and the heat exchanger was operated for two hours while the temperature of the refrigerant passing through the heat transfer tubes was 50° C. The draft resistance B is the value of draft resistance when the heat exchanger model was set up in an environment in which the air speed in the front surface of the heat exchanger was 1.5 m/s, the dry-bulb temperature when the surfaces of the hydrophilic layers of the fins were dry was 27° C., and the wet-bulb temperature was 19.5° C.; and the heat exchanger was operated for eight hours while the temperature of the refrigerant passing through the heat transfer tubes was 5° C., producing condensed water on the surfaces of the fins. The contact angle was a large value; i.e., 90 degrees, when condensed water was produced in the model having the above conditions and condensed water scattering was confirmed when an air flow was supplied at a local air rate of 2.5 m/s or greater, and it was therefore a condition that the contact angle in the surfaces of the hydrophilic layers of the fins of the heat exchanger in the present invention be 50 degrees or less.

Figure 9:
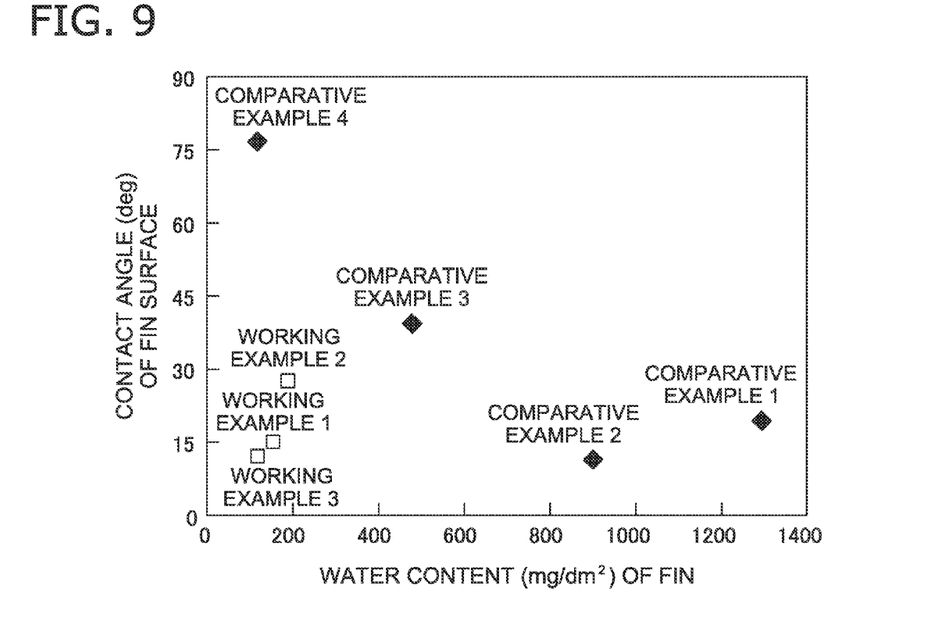
FIG. 9 is a table showing water content and contact angle in each of the working examples and comparative examples.

Based on the values of the working examples and comparative examples described above, FIG. 9 shows the relationship between water content and contact angle in Working Examples 1 to 3 and Comparative Examples 1 to 4. According to the results shown in FIG. 9, the contact angles in Working Examples 1 to 3 and Comparative Examples 1 to 3 were all 50 degrees or less, fulfilling the condition. However, in Comparative Example 4, although the water content was satisfactory at 400 mg/dm$^2$ or less, it was clear the condition was not fulfilled because the contact angle was at least 50 degrees.

INDUSTRIAL APPLICABILITY

With the fin of the heat exchanger, the heat exchanger, and the air conditioning apparatus of the present invention, it is possible to suppress increases in draft resistance and/or scattering of water and to reduce the occurrence of odor even when condensed water adheres to the fin surfaces, and the present invention is therefore particularly useful when used in an air conditioning apparatus that performs at least an air-cooling operation and/or a dehumidifying operation.

CITATION LIST

Patent Literature

<Patent Literature 1> Japanese Laid-open Patent Application No. 2008-215757

What is claimed is:

1. A fin for a heat exchanger of an air conditioning apparatus, the fin comprising:
    a base material;
    a hydrophilic layer; and
    a corrosion-resistant layer provided between the base material and the hydrophilic layer;
    a contact angle of a surface of the hydrophilic layer with water being no more than 50 degrees; and
    a water content of the hydrophilic layer per dm$^2$ of the surface of the hydrophilic layer being at least 60 mg/dm$^2$ and no more than 300 mg/dm$^2$,
    the water content being a value obtained by immersing a bottom end of the fin into 1 mm or more of water, recording a mass of the fin when immersed as an initial mass submerging the fin in a predetermined depth of water and leaving the fin submerged for fourteen hours, finding a difference between the initial mass and the mass measured thirty seconds after returning the fin to a position where the initial mass was measured, and dividing the difference by the surface area.

2. The fin of a heat exchanger according to claim 1, wherein the contact angle of the surface of the hydrophilic layer with water is no more than 30 degrees.

3. The fin of a heat exchanger according to claim 1, wherein a film thickness of the hydrophilic layer is at least 0.1 μm and no more than 10 μm.

4. The fin of a heat exchanger according to claim 1, wherein the hydrophilic layer includes, as a coating film forming component, one of:
    a polymer configured from a monomer having one or at least two hydrophilic functional groups selected from a group consisting of a carboxylic acid group, a sulfonic acid group, a hydroxy group, an amide group, and an ether bond;
    a copolymer including the monomer; and
    a mixture of the polymer and the copolymer.

5. A heat exchanger including the fin according to claim 1.

6. An air conditioning apparatus including the heat exchanger according to claim 5, the air conditioning apparatus further comprising:
    a fan configured to blow air at the heat exchanger;
    a compressor; and
    a control unit configured to perform thermo-otf operation control to drive the fan while driving of the compressor has been stopped.

7. A heat exchanger including the fin according to claim 2.

8. An air conditioning apparatus including the heat exchanger according to claim 7, the air conditioning apparatus further comprising:
    a fan configured to blow air at the heat exchanger;
    a compressor; and
    a control unit configured to perform thermo-off operation control to drive the fan while driving of the compressor has been stopped.

9. A heat exchanger including the fin according to claim 3.

10. An air conditioning apparatus including the heat exchanger according to claim 9, the air conditioning apparatus further comprising:
    a fan configured to blow air at the heat exchanger;
    a compressor; and
    a control unit configured to perform thermo-off operation control to drive the fan while driving of the compressor has been stopped.

11. A heat exchanger including the fin according to claim 4.

12. An air conditioning apparatus including the heat exchanger according to claim 11, the air conditioning apparatus further comprising:
    a fan configured to blow air at the heat exchanger;
    a compressor; and
    a control unit configured to perform thermo-off operation control to drive the fan while driving of the compressor has been stopped.

\* \* \* \* \*